S. W. CRAMER & W. B. HODGE.
AIR CONDITIONING APPARATUS.
APPLICATION FILED FEB. 10, 1911.
1,075,197.
Patented Oct. 7, 1913.
4 SHEETS—SHEET 4.
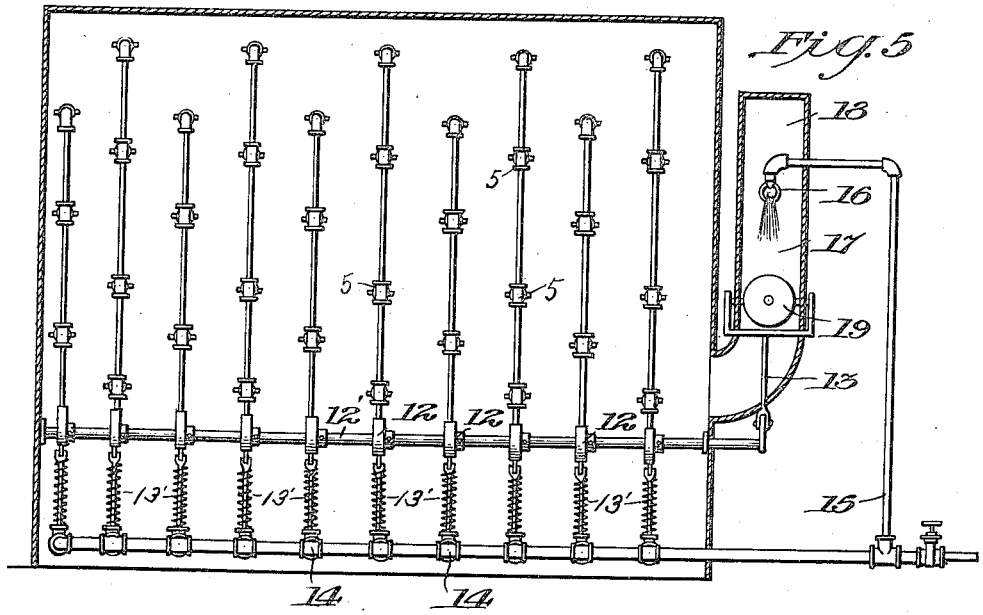
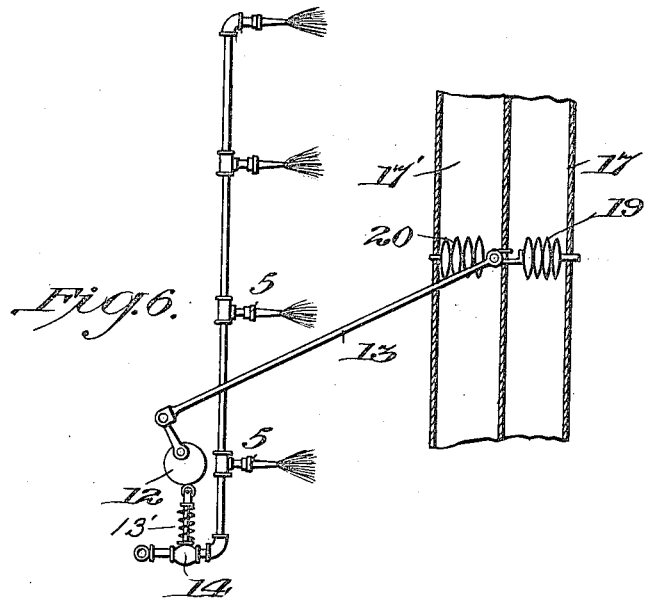

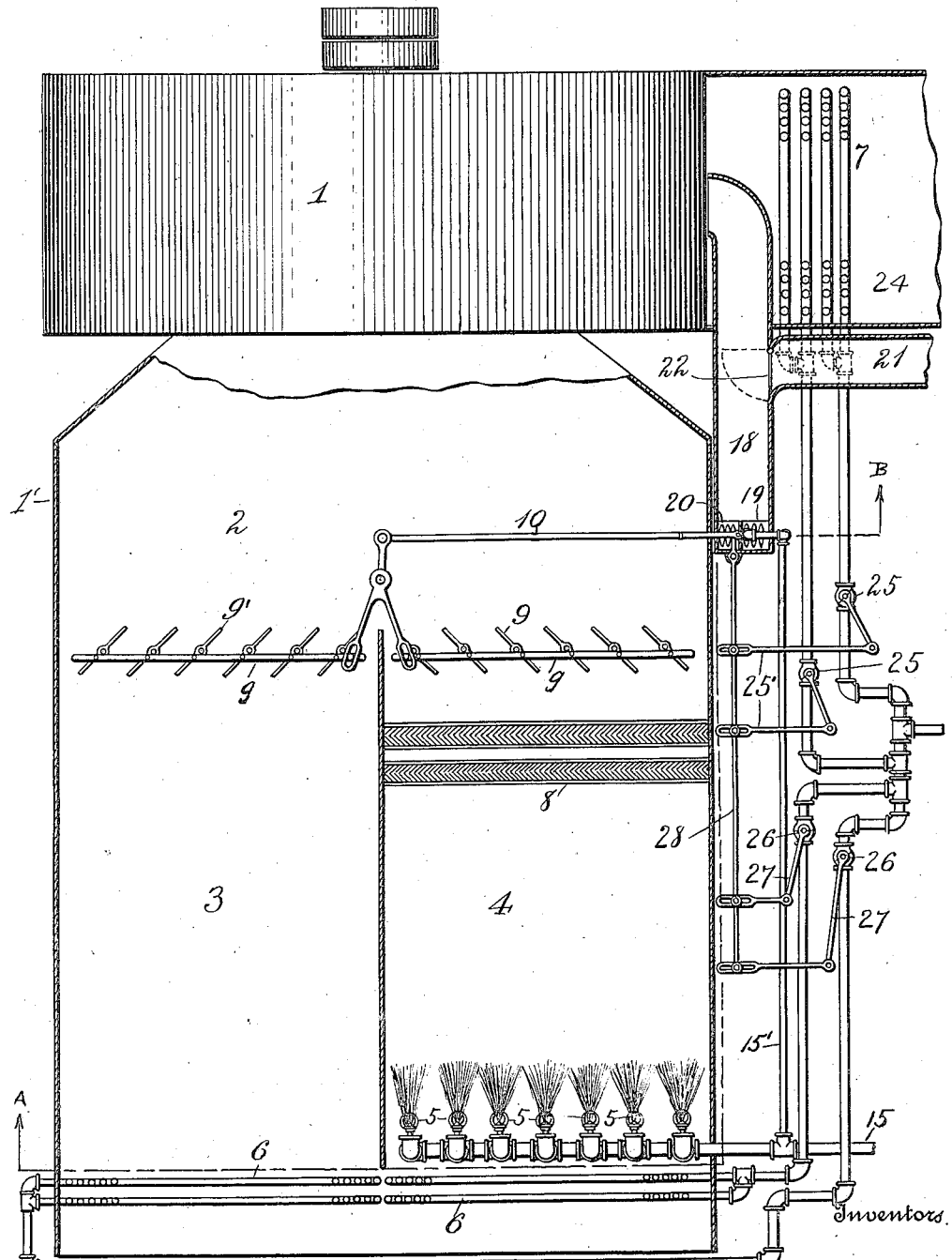

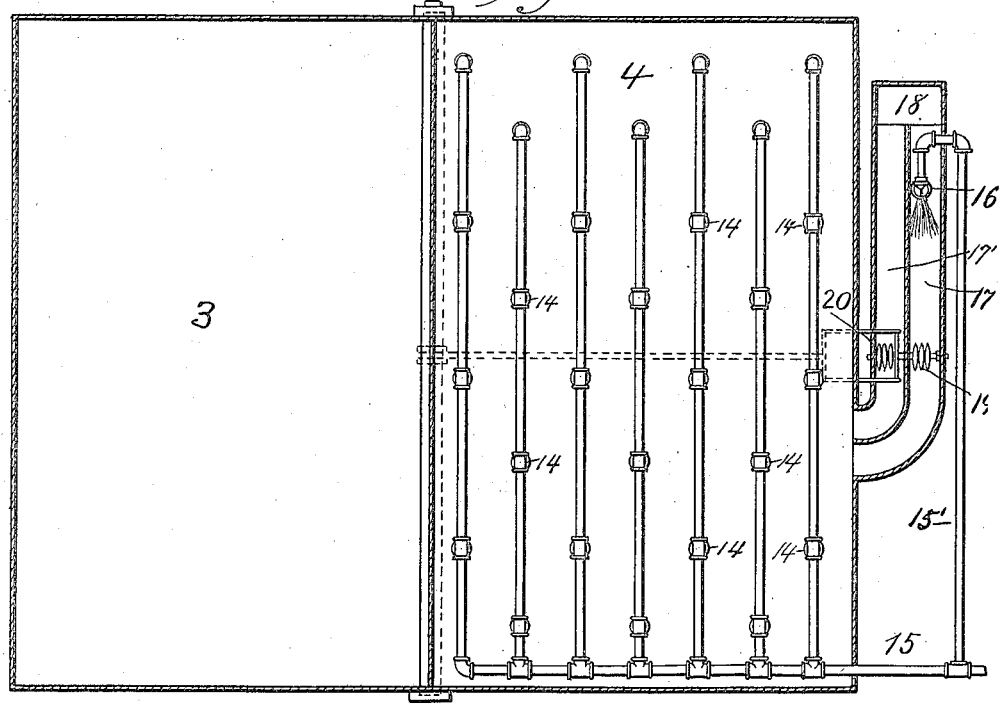
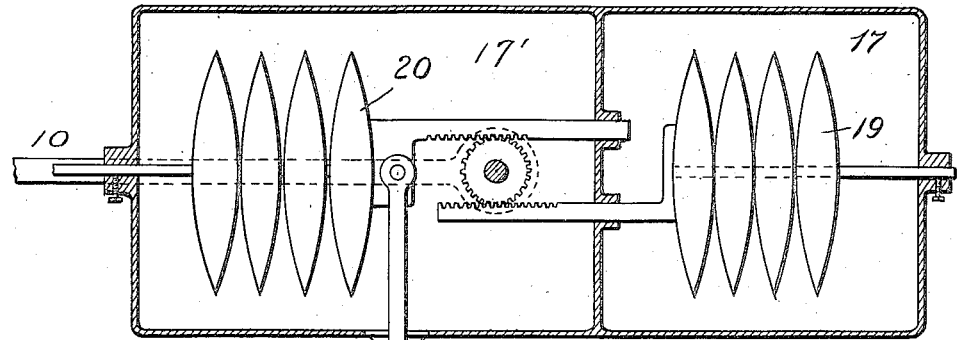
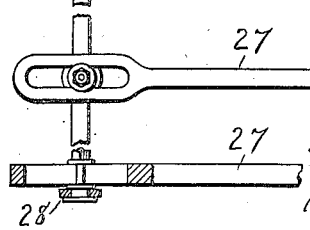

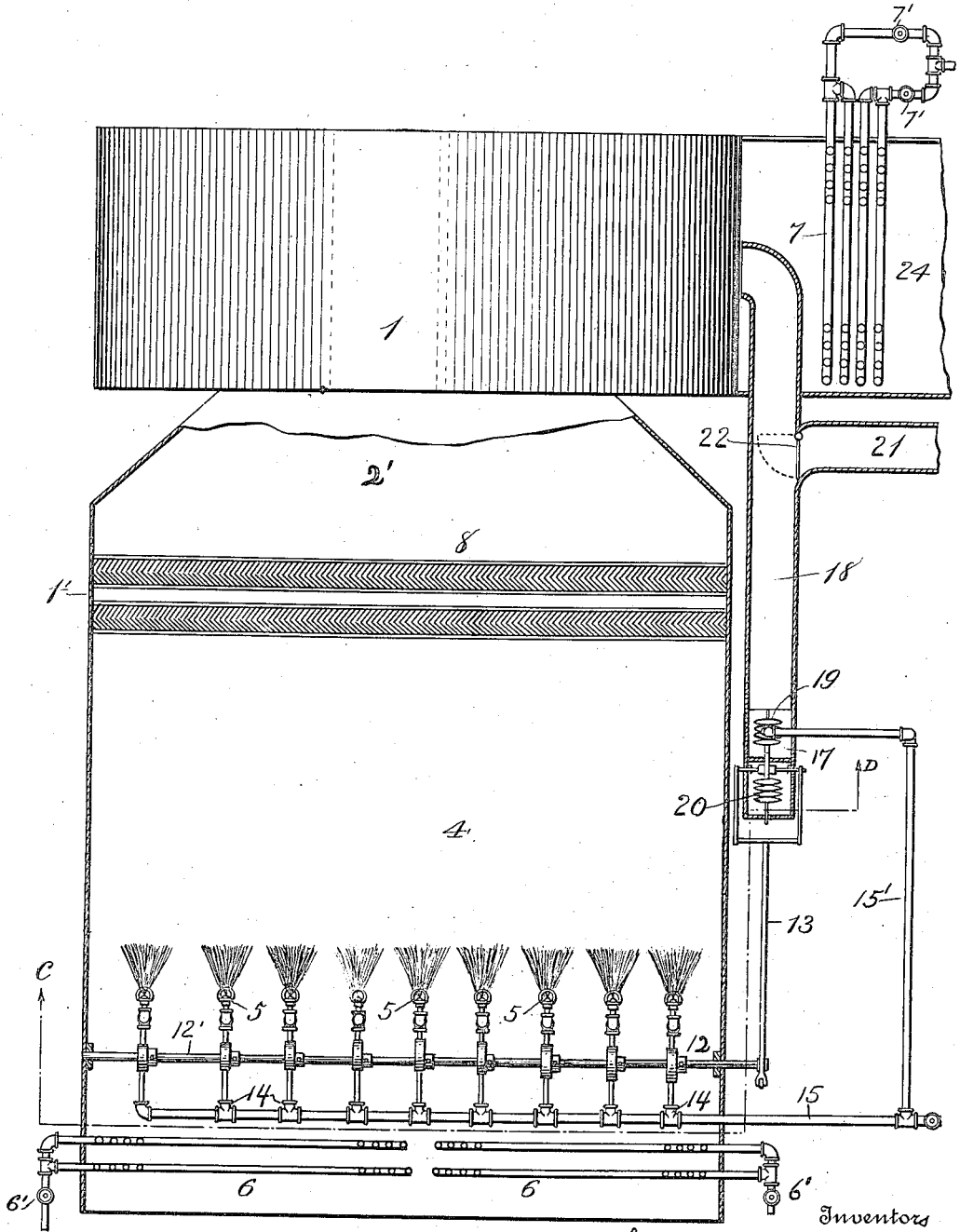

UNITED STATES PATENT OFFICE.

STUART W. CRAMER AND WILLIAM B. HODGE, OF CHARLOTTE, NORTH CAROLINA; SAID HODGE ASSIGNOR TO SAID CRAMER.

AIR-CONDITIONING APPARATUS.

1,075,197.      Specification of Letters Patent.      Patented Oct. 7, 1913.

Application filed February 10, 1911. Serial No. 607,849.

*To all whom it may concern:*

Be it known that we, STUART W. CRAMER and WILLIAM B. HODGE, citizens of the United States, residing at Charlotte, in the county of Mecklenburg and State of North Carolina, have invented certain new and useful Improvements in Air-Conditioning Apparatus; and we do hereby declare the following to be a full, clear, and exact description of the invention, such as will enable others skilled in the art to which it appertains to make and use the same.

This invention relates to apparatus for treating air, whereby the air is cleansed of its impurities and at the same time conditioned both as to relative humidity and temperature, while at the same time the moisture and temperature are automatically controlled.

The object of the invention is to provide a new arrangement of parts whereby ventilating and heating systems can be more accurately controlled than heretofore, especially by means of variably proportioning the moisture to the heat.

The invention consists in modifications of the constructions shown in some of the previous patents to Stuart W. Cramer and William B. Hodge, and will be fully disclosed in the following specification and claims.

In the accompanying drawings, which form part of this specification:—Figure 1 represents a horizontal sectional plan view of our improved apparatus. Fig. 2 a vertical transverse section of the same on line A—B, Fig. 1. Fig. 3 represents an enlarged diagrammatic view of the regulating device. Fig. 4 represents a horizontal sectional plan view of a modified construction. Fig. 5 represents a diagrammatic view of the regulator and its connection to a section of the spray-device, and Fig. 6 represents a detail of the regulator applied to the moisture producing apparatus.

Reference being had to the drawings and the designating characters thereon, the numeral 1 indicates a fan such as is ordinarily used in heating and ventilating systems. 1' a casing, 2 a commingling chamber within the casing from which the fan draws air to be forced out into the rooms to be heated and ventilated.

3 is a chamber or passage through which air is introduced into the fan without the addition of moisture.

4 is a spray chamber in which the air is thoroughly washed and humidified by means of the water spray produced by the nozzles 5.

6, 6 are heater coils so arranged that the air coming into the casing can be tempered, and in the exit duct 24 leading to the room is a coil 7, so that the air issuing from the fan can be heated to any desired temperature after having had the desired amount of moisture added to it.

8 indicates baffle plates which condense and separate the coarse spray carried along by the air and permit only the saturated air from which all particles of free moisture have been removed, to pass into the commingling chamber 2.

9, 9, indicate dampers, the blades 9' in front of the plates 8 being fixed at right angles to the blades 9' in chamber 3, in other words, when the damper is arranged so that the blades in chamber 3 are open, allowing the current of air to pass through chamber 3 into the commingling chamber 2, when the blades in front of the baffle plates 8 will be closed. In like manner, when the blades in the chamber 3 are closed, those in front of the baffle plates 8 are open. Intermediate positions are likewise differentially proportioned. The action of the dampers is controlled by rod 10 attached to regulating mechanism, which will be described later.

15 is a water supply pipe carrying water to the nozzles at any desired pressure.

16 is an auxiliary spray nozzle continuously supplied with water from the supply pipe 15 through pipe 15' and so arranged that whenever pressure is on this supply pipe, a spray will always issue from it, regardless of whether or not all the valves actuated by the shaft 12' are closed or not.

17 is a compartment containing the wet bulb member 19 of the regulator and is supplied with air through duct 18 from the preferred source as determined by damper 22. This air after having been surcharged with moisture by means of the spray from nozzle 16 passes down the side of the fan casing 1' and back into the fan.

20 indicates the dry bulb member of the regulating device, and is contained in an adjoining compartment 17', also supplied with air from the duct 18. After passing over the dry bulb member, this air is also sucked back into the fan. It will be seen, therefore, that the source of air supply 18 is led, partly over the wet bulb member, after having been saturated with water, thereby maintaining the wet bulb member at the temperature of evaporation, and another part of this current of air passes over the dry bulb member 20, maintaining it at its proper dry bulb temperature. It will be seen, therefore, that the action of this regulator depends upon the difference in temperature between the wet and dry bulb members, which in turn is dependent upon the relative humidity of the air, for this regulator is actuated by differences in temperature, or, in other words, differences in relative humidity of the air passing through the duct 18.

If it is desired to actuate the regulator from some other source of air rather than that delivered by the fan 1, a separate duct 21 is led back from the room or other compartments, the conditions of which it is desired to control, and the damper 22 thrown over to the side as indicated by the dotted lines. It is evident that the source of air supply to the regulator will then be through duct 21. It is also evident that this damper 22 can be set in any intermediate position so that any desired amount of air can be taken from either of the two sources.

The dry bulb member 20 is independently connected to a lever 28 which in turn is connected to valves 25, 26 controlling the heat supply to coils 6, 6, and 7, 7. As the temperature of the air through the duct 18 rises and the dry bulb member 20, expands, the heat will be cut off from the coils 6, 6, 7, 7 in any predetermined order, depending on the setting of the lever connections 25', and 27.

The operation of the apparatus is as follows: The fan 1, driven by any desired source of power, draws air from the commingling chamber 2. Air is supplied to this commingling chamber 2 either through spray chamber 4 or air chamber or passage 3, or both, depending upon the position of the dampers 9. Assuming that the air entering the regulator will so influence the members as to cause them to set damper blades 9' that the air entering the commingling chamber 2 will be drawn through the spray chamber 4, the air, therefore, must be at the point of saturation, it having been thoroughly saturated by means of the spray. If the regulator is set to a condition less than that of saturation, then the air delivered by the fan will so act on the wet and dry bulb members as to partially close the blades of the damper in the spray chamber 4, and at the same time the blades of the damper in the chamber 3 will be partially opened. In other words, the air entering the commingling chamber 2 will consist partly of saturated air which has passed through the spray and the spray chamber 4, and also drier air from any desired source of supply through chamber 3. It is evident also that this regulator will move these damper blades 9' back and forth until the proper proportions of moistened and dry air are admitted to the commingling chamber 2, so that the air passing through duct 18 is of the exact moisture content desired, or rather the exact moisture content that the regulator is set to maintain.

In Figs. 4 and 5 (the modified construction), 12 indicates a plurality of cams rigidly attached to shaft 12' which in turn is connected by rod 13 to the regulating attachment. As this shaft 12' is turned axially by means of the regulator, all of the cams 12 attached to this shaft revolve and actuate the valve stems 13' to their corresponding valves, the first cam 12 as it moves pressing down the valve stem to the first valve 14. This shuts off the water supply to the first series of spray nozzles 5. As this shaft 12' rotates a little farther, the next cam will in turn depress its corresponding valve stem and the water will be shut off from the second series of spray nozzles, and so on throughout all the valves and spray nozzles. The action of the regulator is similar, in that if the degree of moisture in the air passing through the duct 18 is too great, owing to the fact that all of the sprays are turned on, the regulator gradually cuts these sprays off, thereby lessening the amount of moisture in the air passing through the fan and the duct 18, until an equilibrium is established in the regulator, and the number of sprays which are still operating, will be just sufficient to properly moisten the air passing through the fan in accordance with the humidity at which the regulator may be set, and thus also supply variable quantities of moisture to the current of air.

So far as the specific action of the regulator itself is concerned, this in general is similar to the regulator disclosed in our Patent 960,830. The regulator therein disclosed, however, actuates the cut-off valve by means of compressed air; whereas the one shown in this application is such that the expansion and contraction of both the wet and dry bulb members is jointly communicated to the actuating connecting rod 13. We do not limit ourselves, however, nor do we make any claim for any particular construction of regulating device.

It is obvious that changes in details of construction may be made without departing from the spirit of our invention.

The regulator forms subject-matter of a separate application for Letters-Patent filed February 11, 1911, Serial Number 608,065.

Having thus fully described our invention, what we claim is—

1. A humidifier comprising a casing, means for producing a current of air through the casing, means comprising a sectionally controlled spraying device for varying the moisture content of said air, and a humidity controlling device for successively actuating the valves connected to said spraying device.

2. A humidifier comprising a casing, a spraying device, means for producing a current of air through the casing, two thermo-expansive members for variably controlling the moisture to said current of air, and means for continuously supplying said thermo-expansive members with air from a selected source other than that supplied to the spraying device.

3. A humidifier comprising a casing, means for producing a current of unsaturated air through the casing, means for saturating a greater or less proportion of the unsaturated air, and a humidity controlling device to vary the said proportion.

4. A humidifier comprising a casing, means for producing a current of unsaturated air through the casing, means for saturating a greater or less proportion of the unsaturated air, and two thermo-expansive members for varying the said proportion.

5. A humidifier comprising a casing, means for producing a current of unsaturated air through the casing, means for saturating a greater or less proportion of the unsaturated air, means for varying the temperature of the mixed air, and a regulating device for controlling the percentage of saturation and the temperature of the mixed air.

6. A humidifier comprising a casing, means for producing a current of air through the casing, a spraying device for saturating part of the air coming into the casing, means for commingling the saturated and unsaturated air, and a wet and dry bulb humidity controlling device to regulate the mixture.

7. A humidifier comprising a casing, means for producing a current of unsaturated air through the casing, means for saturating a greater or less proportion of the unsaturated air, means for varying the temperature of said mixed air, and two thermo-expansive members, one of which controls the temperature of the air and both of which independently actuate a third member for varying the percentage of saturation of said mixed air.

In testimony whereof we affix our signatures, in presence of two witnesses.

STUART W. CRAMER.
WILLIAM B. HODGE.

Witnesses:
 JNO. C. WATSON,
 ROBERT I. DALTON.